US009163785B2

(12) United States Patent
Mackey

(10) Patent No.: US 9,163,785 B2
(45) Date of Patent: Oct. 20, 2015

(54) PUMPLESS FLUID DISPENSER

(71) Applicant: GP Strategies Corporation, Elkridge, MD (US)

(72) Inventor: Michael Mackey, San Diego, CA (US)

(73) Assignee: GP STRATEGIES CORPORATION, Columbia, MD (US)

( * ) Notice: Subject to any disclaimer, the term of this patent is extended or adjusted under 35 U.S.C. 154(b) by 194 days.

(21) Appl. No.: 13/856,261

(22) Filed: Apr. 3, 2013

(65) Prior Publication Data

US 2013/0263609 A1 Oct. 10, 2013

Related U.S. Application Data

(63) Continuation-in-part of application No. 13/439,777, filed on Apr. 4, 2012.

(51) Int. Cl.

| | |
|---|---|
| ***F17C 13/02*** | (2006.01) |
| ***F17C 7/02*** | (2006.01) |
| ***F16L 53/00*** | (2006.01) |

(52) U.S. Cl.
CPC ................. *F17C 13/02* (2013.01); *F16L 53/00* (2013.01); *Y10T 137/6416* (2015.04)

(58) Field of Classification Search
CPC .................... F17C 2223/0161; F17C 2227/04; F17C 2227/041; F17C 2227/043; F17C 13/02
USPC ................................................. 62/49.1, 50.1
See application file for complete search history.

(56) References Cited

U.S. PATENT DOCUMENTS

| | | | | |
|---|---|---|---|---|
| RE28,856 E | | 6/1976 | Leonard | |
| 5,121,609 A | | 6/1992 | Cieslukowski | |
| 5,127,230 A | | 7/1992 | Neeser et al. | |
| 5,228,295 A | | 7/1993 | Gustafson | |
| 5,231,838 A | | 8/1993 | Cieslukowski | |
| 5,360,139 A | | 11/1994 | Goode | |
| 5,411,374 A | | 5/1995 | Gram | |
| 5,454,408 A | * | 10/1995 | DiBella et al. | 141/197 |
| 5,477,690 A | | 12/1995 | Gram | |

(Continued)

OTHER PUBLICATIONS

Patent Cooperative Treaty (PCT) International Search Report issued on Jun. 27, 2013 in corresponding International Application No. PCT/US2013/035275, 2 pages.

*Primary Examiner* — Allen Flanigan
*Assistant Examiner* — Filip Zec
(74) *Attorney, Agent, or Firm* — Finnegan, Henderson, Farabow, Garrett & Dunner, LLP

(57) ABSTRACT

Embodiments of the disclosure may include a fluid dispensing system. The system may include a first tank configured to contain a first fluid and a second tank configured to contain a second fluid. The system may also include a plurality of conduits fluidly connecting the first and second tanks, wherein the first fluid in the first tank is configured to be gravity-fed or pressure-fed to the second tank. The system may also include a conditioning system fluidly connected to the second tank. The conditioning system may include at least one conduit fluidly coupled to a lower region of the second tank. The conditioning system may also include a heat exchanger. In addition, the conditioning system may include at least one conduit fluidly coupled to an upper region of the second tank. The conditioning system may be capable of a first configuration that returns fluid from the heat exchanger to a lower region of the second tank, and a second configuration that returns fluid from the heat exchanger to an upper region of the second tank.

21 Claims, 3 Drawing Sheets

(56) References Cited

U.S. PATENT DOCUMENTS

| | | | | |
|---|---|---|---|---|
| 5,551,488 | A | 9/1996 | Gram | |
| 5,616,838 | A | 4/1997 | Preston et al. | |
| 5,682,750 | A | 11/1997 | Preston et al. | |
| 5,687,776 | A * | 11/1997 | Forgash et al. | 141/11 |
| 5,771,946 | A | 6/1998 | Dooy et al. | |
| 5,787,940 | A | 8/1998 | Bonn et al. | |
| 5,924,291 | A | 7/1999 | Weiler et al. | |
| 5,937,655 | A | 8/1999 | Weiler et al. | |
| 5,954,101 | A | 9/1999 | Drube et al. | |
| 6,044,647 | A | 4/2000 | Drube et al. | |
| 6,237,347 | B1 * | 5/2001 | Rigby et al. | 62/48.1 |
| 6,311,738 | B1 * | 11/2001 | Mason | 141/18 |
| 6,354,088 | B1 | 3/2002 | Emmer et al. | |
| 6,363,728 | B1 | 4/2002 | Udischas et al. | |
| 6,382,235 | B1 | 5/2002 | Drube et al. | |
| 6,505,470 | B1 | 1/2003 | Drube et al. | |
| 6,542,848 | B1 | 4/2003 | Neeser et al. | |
| 6,595,048 | B1 | 7/2003 | Drube et al. | |
| 6,622,758 | B2 | 9/2003 | Drube et al. | |
| 6,631,615 | B2 | 10/2003 | Drube et al. | |
| 6,640,554 | B2 | 11/2003 | Emmer et al. | |
| 6,692,034 | B2 | 2/2004 | Drube et al. | |
| 6,698,211 | B2 | 3/2004 | Gustafson | |
| 6,732,594 | B2 | 5/2004 | Drube et al. | |
| 6,782,339 | B2 | 8/2004 | Neeser et al. | |
| 6,955,095 | B2 | 10/2005 | Drube et al. | |
| 7,069,730 | B2 | 7/2006 | Emmer et al. | |
| 7,131,278 | B2 | 11/2006 | Svensson et al. | |
| 7,740,031 | B2 * | 6/2010 | Egan et al. | 141/105 |
| 2005/0193743 | A1 | 9/2005 | Foss et al. | |
| 2006/0218941 | A1 | 10/2006 | Drube | |
| 2011/0146605 | A1 | 6/2011 | Dixon et al. | |

* cited by examiner

PUMPLESS FLUID DISPENSER

I. DESCRIPTION

This is a continuation-in-part of U.S. patent application Ser. No. 13/439,777, filed Apr. 4, 2012, the entirety of which is expressly incorporated herein by reference.

FIELD OF THE DISCLOSURE

Embodiments of the present disclosure include dispensers, and more particularly, dispensers for dispensing a fluid, such as a cryogenic liquid, including, but not limited to, liquefied natural gas (LNG).

BACKGROUND OF THE DISCLOSURE

Generally, liquefied natural gas presents a viable fuel alternative to, for example, gasoline and diesel fuel. More specifically, LNG may be utilized as an alternative fuel to power certain vehicles and/or power generation plants. Accordingly, there has been an increasing demand for LNG dispensing stations. To meet this demand, a greater number of LNG dispensing stations are being built in increasingly remote locations in order to service the industries that depend on LNG fuel. This presents a range of issues, including station maintenance, safety, and accuracy.

Storing LNG in dispensing stations and vehicle tanks requires specialized equipment because LNG is stored at temperatures of below approximately −200° F. (−130° C.). Further, LNG dispensers should be able to do this with minimized venting of LNG to the atmosphere, because venting wastes LNG and poses potential environmental and safety concerns.

While storing bulk quantities of LNG at low pressures is more convenient, many engines cannot operate efficiently under low pressures. Accordingly, LNG may be stored in vehicle tanks in an elevated saturated state in order to maintain the desired pressure while the vehicle is in motion. An elevated LNG saturation state generally occurs by heating the LNG prior to dispensing.

LNG is typically transferred from a bulk storage tank, saturated, and dispensed to a vehicle tank through pumps or other mechanical or rotating equipment (herein generally referred to as pumps) to achieve the pressure gradients required for transfer, as well as to assist with LNG saturation prior to dispensing. Such equipment, however, may be expensive to purchase and maintain, adding to maintenance and operation costs of dispensing stations. Pumps require significant energy to run, as well as proper cooling and lubrication. Accordingly, such devices add to the size, weight, and complexity of dispensing systems.

Accurately measuring the amount of LNG dispensed for use also poses a primary concern in commercializing LNG. Particularly, the National Institute of Standards and Technology of the United States Department of Commerce has developed guidelines for federal Weights and Measures certification, whereby dispensed LNG must be metered on a mass flow basis with a certain degree of accuracy.

Accordingly, prior art devices require improvement to achieve compact and easy-to-maintain dispensing systems capable of accurately dispensing pressurized fluids without the use of pumps. The dispensing systems described herein aim to address these and other limitations of the prior art in an economical and safe fashion.

II. SUMMARY OF THE DISCLOSURE

Embodiments of the present disclosure provide a pumpless fluid dispensing system.

In accordance with one embodiment, a fluid dispensing system may include a first tank configured to contain a first fluid and a second tank configured to contain a second fluid. The system may also include a plurality of conduits fluidly connecting the first and second tanks, wherein the first fluid in the first tank is configured to be gravity-fed or pressure-fed to the second tank. The system may also include a conditioning system fluidly connected to the second tank. The conditioning system may include at least one conduit fluidly coupled to a lower region of the second tank. The conditioning system may also include a heat exchanger. In addition, the conditioning system may include at least one conduit fluidly coupled to an upper region of the second tank. The conditioning system may be capable of a first configuration that returns fluid from the heat exchanger to a lower region of the second tank, and a second configuration that returns fluid from the heat exchanger to an upper region of the second tank.

In accordance with another embodiment, a fluid dispensing system may include a first tank configured to contain a first fluid, a second tank configured to contain a second fluid, and a third tank configured to contain a third fluid. The system may also include a plurality of conduits fluidly connecting the first, second, and third tanks, wherein the first fluid in the first tank is configured to be gravity-fed or pressure-fed to the second tank or the third tank, and the third fluid in the third tank is configured to be gravity-fed or pressure-fed to the second tank. The system may also include a conditioning system fluidly connected between the third tank and the second tank. The conditioning system may include at least one conduit fluidly coupled to a lower region of the third tank. The conditioning system may also include one or more heat exchangers. In addition, the conditioning system may include at least one conduit fluidly coupled to an upper region of the second tank. The conditioning system may be capable of a first configuration that returns fluid from the heat exchanger to a lower region of the second tank, a second configuration that returns fluid from the heat exchanger to an upper region of the second tank, and a third configuration that returns fluid from the heat exchanger to an upper region of the third tank.

In accordance with another embodiment, a method for dispensing a fluid without the use of a pump may include gravity-feeding or pressure-feeding a fluid from a first tank to a second tank. The method may also include saturating the fluid in the second tank. The saturating may include dispensing the fluid from a lower region of the second tank, passing the fluid through a heat exchanger, and returning the fluid to a lower region of the second tank. The method may also include pressurizing the fluid in the second tank. The pressurizing may include dispensing the fluid from a lower region of the second tank, passing the fluid through a heat exchanger, and returning the fluid to an upper region of the second tank.

In accordance with another embodiment, a method for dispensing a fluid without the use of a pump may include gravity-feeding or pressure-feeding a fluid from a first tank to a second tank and may include gravity-feeding or pressure-feeding a fluid from a first tank to a third tank. The method may also include saturating the fluid in the second tank. The saturating may include dispensing the fluid from a lower region of the third tank, passing the fluid through a heat exchanger, and returning the fluid to a lower region of the second tank. The method may also include pressurizing the fluid in the second tank. The pressurizing may include dispensing the fluid from a lower region of the third tank, passing the fluid through a heat exchanger, and returning the fluid to an upper region of the second tank. The method may also include pressurizing the fluid in the third tank. The pressurizing may include dispensing the fluid from a lower region of the third tank, passing the fluid through a heat exchanger, and returning the fluid to an upper region of the third tank.

In accordance with yet another embodiment of the disclosure, an LNG dispensing system may include a control system including a programmable logic controller. The system may also include a first tank configured to contain LNG and a second tank configured to contain LNG, wherein the first tank is positioned so that a bottom region of the first tank is positioned above an upper region of the second tank. The system may also include a plurality of conduits fluidly connecting the first and second tanks, wherein the LNG in the first tank is configured to be gravity-fed or pressure-fed to the second tank. The system may further include one or more measuring devices for measuring at least one property of the LNG. At least one measuring device may be operatively coupled to the second tank. In addition, the system may include a conditioning system fluidly connected to the second tank. The conditioning system may include at least one conduit fluidly coupled to a lower region of the second tank. The conditioning system may further include a heat exchanger, wherein the heat exchanger includes a vaporizer configured to facilitate the transfer of energy with ambient conditions to at least partially vaporize the LNG passed through it. The conditioning system may also include at least one conduit fluidly coupled to an upper region of the second tank. The conditioning system may be capable of a first configuration for saturating LNG that returns the at least partially vaporized LNG from the heat exchanger to a lower region of the second tank via a sparging nozzle. The conditioning system may also be capable of a second configuration for pressurizing the LNG that returns the at least partially vaporized LNG from the heat exchanger to an upper region of the second tank.

In accordance with yet another embodiment of the disclosure, an LNG dispensing system may include a control system including a programmable logic controller. The system may also include a first tank configured to contain LNG, a second tank configured to contain LNG, and a third tank configured to contain LNG, wherein the first tank is positioned so that a bottom region of the first tank is positioned above an upper region of the second tank and above an upper region of the third tank. The system may also include a plurality of conduits fluidly connecting the first, second, and third tanks, wherein the LNG in the first tank is configured to be gravity-fed or pressure-fed to the second tank and to the third tank. The system may further include one or more measuring devices for measuring at least one property of the LNG. At least one measuring device may be operatively coupled to the second tank and at least one measuring device may be operatively coupled to the third tank. In addition, the system may include a conditioning system fluidly connected to the second tank and the third tank. The conditioning system may include at least one conduit fluidly coupled to a lower region of the third tank. The conditioning system may further include one or more heat exchangers, wherein the one or more heat exchangers include a vaporizer configured to facilitate the transfer of energy with ambient conditions to at least partially vaporize the LNG passed through it. The conditioning system may also include at least one conduit fluidly coupled to an upper region of the third tank. In addition, the conditioning system may also include at least one conduit fluidly coupled to an upper region of the second tank and at least one conduit fluidly coupled to a lower region of the second tank. The conditioning system may be capable of a first configuration for saturating LNG from the third tank that is at least partially vaporized LNG from the heat exchanger to a lower region of the second tank via a sparging nozzle. The conditioning system may also be capable of a second configuration for pressurizing the second tank with LNG that returns the at least partially vaporized LNG from the heat exchanger to an upper region of the second tank. The conditioning system may also be capable of a third configuration for pressurizing the third tank with LNG that returns the at least partially vaporized LNG from the heat exchanger to an upper region of the third tank.

In accordance with an embodiment of the present disclosure, a fluid dispensing system may include a first tank configured to contain a first fluid, a second tank configured to contain a second fluid, a third tank configured to contain a third fluid, a plurality of conduits fluidly connecting the first, second, and third tanks, wherein the first fluid in the first tank is configured to be gravity-fed or pressure-fed to the second tank, the first fluid in the first tank is configured to be gravity-fed or pressure-fed to the third tank, and the third fluid in the third tank is configured to be gravity-fed or pressure-fed to the second tank, and a conditioning system. The conditioning system may fluidly connect the third tank and the second tank and may include at least one conduit fluidly coupled to a lower region of the third tank and a first heat exchanger, and may be capable of a first configuration that returns fluid from the first heat exchanger to a upper region of the third tank and a second configuration that prevents fluid from the heat exchanger from returning to an upper region of the third tank. The conditioning system may also include at least one conduit fluidly coupled to a lower region of the third tank, and a second heat exchanger, and may be capable of a third configuration that directs fluid from the second heat exchanger to an upper region of the second tank, and a fourth configuration that substantially prevents the flow of fluid from the second heat exchanger to an upper region of the second tank. The conditioning system may also include at least one conduit fluidly coupled to a lower region of the second tank, wherein the conditioning system is capable of a fifth configuration that directs fluid from the second heat exchanger to a lower region of the second tank, and a sixth configuration that substantially prevents the flow of fluid from the second heat exchanger to a lower region of the second tank.

Various embodiments of the system may include one or more of the following features: the system may not include a pump; the first and the second heat exchangers may facilitate the transfer of energy with an ambient condition and may each include a vaporizer configured to at least partially vaporize the fluid passed through them; the system may include a sparging nozzle, wherein the system in the fifth configuration returns the partially vaporized fluid to the lower region of the second tank through the sparging nozzle; the second fluid may be the same as the first fluid and the third fluid may be the same as the first fluid; the fluid may be liquefied natural gas; the system may include a control system, which may include a programmable logic controller; the first tank may be positioned so that the bottom of the first tank is located above the top of the second tank and above the top of the third tank; one or more measuring devices may be configured to measure at least one property of the fluid; the one or more measuring devices may be operatively coupled to at least one of the second tank and the third tank; the first tank, the second tank, and the third tank may be fluidly connected to each other by a first conduit having a proximal end, a first distal end, and a second distal end, wherein the first conduit proximal end is fluidly connected to an upper region of the first tank, the first conduit first distal end is fluidly connected to an upper region of the second tank, and the first conduit second distal end is fluidly connected to an upper region of the third tank and a second conduit having a proximal end, a first distal end, and a second distal end, wherein the second conduit proximal end is fluidly connected to a lower region of the first tank, the second conduit first distal end is fluidly connected to an upper region of the second tank, and the second conduit second distal end is fluidly connected to an upper region of the third tank, wherein the first fluid gravity feeds or pressure feeds from the first tank into the second tank and the third tank via the second conduit, the second fluid gravity feeds or pressure feeds from the second tank into the first tank via the first conduit, and the third fluid gravity feeds or pressure feeds from the third tank into the first tank via the first conduit; and the heat exchangers may be configured to be gravity-fed by the third tank and the conditioning system may pressurize the fluid in the third tank in the first configuration, saturate the second fluid in the second tank in the fifth configuration, and pressurize the second fluid in the second tank in the third configuration.

In accordance with another exemplary embodiment of the present disclosure, a method for dispensing a fluid without the use of a pump may include gravity-feeding or pressure-feeding a fluid from a first tank to a second tank, pressurizing the fluid in the third tank, wherein pressurizing includes dispensing the fluid from a lower region of the third tank, passing the fluid through a heat exchanger, and returning the fluid to an upper region of the third tank, saturating the fluid in the second tank, wherein saturating includes dispensing the fluid from a lower region of the third tank, passing the fluid through a heat exchanger, and passing the fluid into a lower region of the second tank, and pressurizing the fluid in the second tank, wherein pressurizing includes dispensing the fluid from a lower region of the third tank, passing the fluid through a heat exchanger, and passing the fluid into an upper region of the second tank.

Various embodiments of the method may include one or more of the following features: dispensing the fluid to a fourth tank; and venting the fourth tank.

In accordance with another embodiment of the present disclosure, an LNG dispensing system may include a control system including a programmable logic controller, a first tank configured to contain LNG, a second tank configured to contain LNG, wherein the first tank is positioned so that a bottom region of the first tank is positioned above an upper region of the second tank, a third tank configured to contain LNG, wherein the first tank is positioned so that a bottom region of the first tank is positioned above an upper region of the third tank, at least one measuring device for measuring at least one property of the LNG coupled to the second tank and at least one measuring device for measuring at least one property of the LNG coupled to the third tank, and a conditioning system fluidly connected to the second tank and the third tank. The conditioning system may include at least one conduit fluidly coupled to an upper region of the third tank, at least one conduit fluidly coupled to a lower region of the third tank, one or more heat exchangers including a vaporizer configured to facilitate the transfer of energy with an ambient condition to at least partially vaporize the LNG passed through it, at least one conduit fluidly coupled to an upper region of the second tank, and at least one conduit fluidly coupled to a lower region of the second tank, wherein the conditioning system is capable of a first configuration for pressurizing the third tank by returning the at least partially vaporized LNG from the heat exchanger into the upper region of the third tank, a second configuration for saturating the LNG in the second tank by sending the at least partially vaporized LNG from the heat exchanger to a lower region of the second tank via a sparging nozzle, and a third configuration for pressurizing the LNG in the second tank by sending the at least partially vaporized LNG from the heat exchanger to an upper region of the second tank.

Various embodiments of the system may also not include a pump.

In this respect, before explaining at least one embodiment of the present disclosure in detail, it is to be understood that the present disclosure is not limited in its application to the details of construction and to the arrangements of the components set forth in the following description or illustrated in the drawings. The present disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

III.BRIEF DESCRIPTION OF THE DRAWINGS

The accompanying drawings illustrate certain exemplary embodiments of the present disclosure, and together with the description, serve to explain the principles of the present disclosure.

IV. DETAILED DESCRIPTION

Reference will now be made in detail to the exemplary embodiments of the present disclosure described below and illustrated in the accompanying drawings. For convenience, the term "proximal" will be used herein to mean closer to the bulk storage tank described herein, and the term "distal" will be used herein to mean closer to the use device, described herein as a vehicle.

Figure 1:
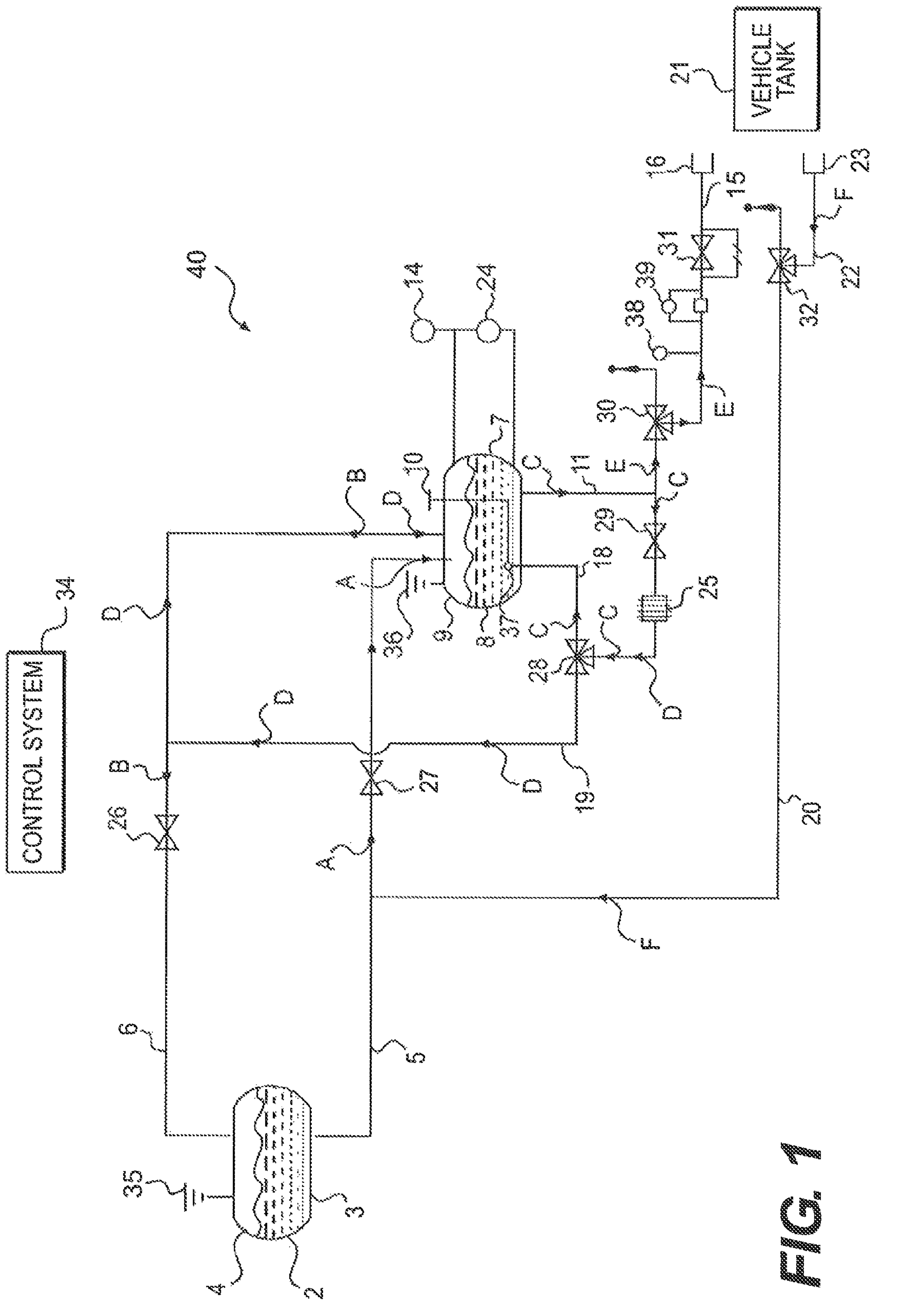
FIG. 1 illustrates a schematic representation of an exemplary fluid dispensing system, according to an embodiment of the present disclosure.

FIG. 1 depicts a schematic representation of a fluid dispensing system 40 with first and second tanks, according to a first exemplary embodiment of the present disclosure. Although FIG. 1 depicts a fluid dispensing system as including a number of various components, those of ordinary skill in the art will readily recognize that one or more of the depicted components may be replaced and/or eliminated without altering the principles of the present disclosure.

Figure 3:
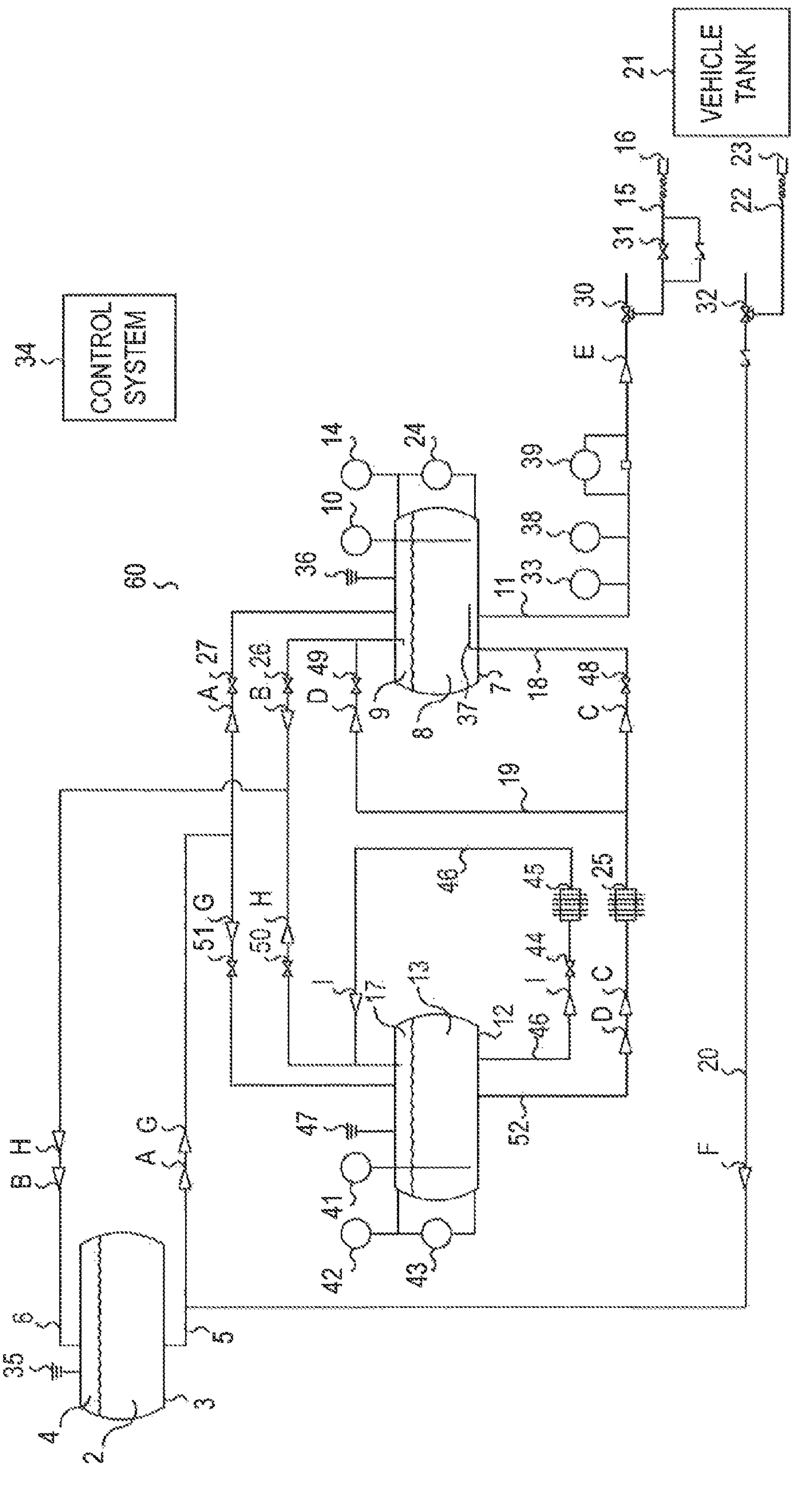
FIG. 3 illustrates a schematic representation of an exemplary fluid dispensing system, according to another embodiment of the present disclosure.

FIG. 3 depicts a schematic representation of a fluid dispensing system 60 with first, second, and third tanks, according to a second exemplary embodiment of the present disclosure. Although FIG. 3 depicts a fluid dispensing system as including a number of various components, those of ordinary skill in the art will readily recognize that one or more of the depicted components may be replaced and/or eliminated without altering the principles of the present disclosure.

Dispensing systems 40 and 60 can be configured to deliver cryogenic fluids, including, but not limited to, LNG. While the present disclosure will refer to LNG as the fluid employed, it should be appreciated that any other fluid may be utilized by the present disclosure, including, but not limited to, Oxygen, Hydrogen, Nitrogen, and/or any suitable fluid or combination of fluids. Dispensing systems 40 and 60 can be configured to deliver LNG to a use device, for instance, a vehicle, a ship (not shown), or the like for fueling. Moreover, the systems and devices described herein can perform non-fueling applications, such as the delivery of fluids to use devices for industrial or non-transportation-related purposes. In addition to vehicles, any other use device may receive the fluid dispensed by dispensing systems 40 and 60.

As indicated in FIG. 1, dispensing system 40 can include a control system 34, a bulk storage tank 3, a dispense tank 7, and a heat exchanger 25. Control system 34 can automate dispensing system 40 such that LNG is directed from bulk storage tank 3 into dispense tank 7, passed through heat exchanger 25, returned to dispense tank 7, and then dispensed to a vehicle tank 21, for example, all with minimal user input. Dispensing system 40 does not include a pump. Thus, the movement of fluid through dispensing system 40 can occur via passive gravity flow, through the use of pressure gradients, or both, achieved without the use of a pump or similar devices.

Alternately, as indicated in FIG. 3, dispensing system 60 can include a control system 34, a bulk storage tank 3, a dispense tank 7, a pressurization tank 12, a heat exchanger 25, and a second heat exchanger 45. Control system 34 can automate dispensing system 60 such that LNG is directed from bulk storage tank 3 into dispense tank 7 and pressurization tank 12, passed through heat exchanger 45, returned to pressurization tank 12, passed from pressurization tank 12 through heat exchanger 25 to dispense tank 7, and then dispensed to a vehicle tank 21 for example, all with minimal user input. Dispensing system 60 does not include a pump. Thus, the movement of fluid through dispensing system 60 can occur via passive gravity flow, through the use of pressure gradients, or both, achieved without the use of a pump or similar devices.

Accordingly, it will be understood that dispensing systems consistent with the present disclosure may include only dispense tank 7 or may include both dispense tank 7 and optional pressurization tank 12. Bulk storage tank 3 can contain a quantity of LNG fluid, which can further include a quantity of LNG 2 and a quantity of vapor NG 4. Bulk storage tank 3 can be maintained at a low pressure relative to dispense tank 7 and pressurization tank 12, if included. For instance, bulk storage tank 3 could be maintained at a pressure of between approximately 0 and 70 psig, dispense tank 7 could be maintained at a pressure of between approximately 0 and 250 psig, and pressurization tank 12 could be maintained at a pressure between approximately 0 and 300 psig. Bulk storage tank 3 can include any type of LNG storage tank, for instance, an insulated bulk storage tank for storing a large volume of LNG. Bulk storage tank 3 can include an inner vessel and one or more outer vessels, as well as insulation in, around, or between the one or more vessels. Bulk storage tank 3 can include a vacuum vessel or vacuum jacket, or any other type of suitable storage tank configuration. Further, bulk storage tank 3 can be horizontal or vertical. Bulk storage tank 3 can be any suitable shape, including cylindrical, barrel-shaped, rectangular, or trapezoidal. Additionally, bulk storage tank 3 can include one or more vent stacks 35 configured to selectively allow vapor to be released from bulk storage tank 3 in order to reduce the pressure within bulk storage tank 3.

One or more valves may be operatively coupled to the one or more vent stacks 35. These valves may be capable of at least two configurations. A first configuration may allow vapor to flow from bulk storage tank 3, through the valves, and out vent stacks 35. Either a user, control system 34, or self-actuating valves may orient the valves in the first configuration. They may do so when the pressure in bulk storage tank 3 has increased above a certain threshold in order to decrease the pressure in bulk storage tank 3. This threshold may be adjustable in some embodiments. The valves may also be capable of a second configuration that may substantially prevent vapor from flowing through the valves and out of bulk storage tank 3. Either a user, control system 34, or self-actuating valves may orient the valves in the second configuration. They may do so when the pressure in bulk storage tank 3 drops below a certain threshold. This threshold may be adjustable in some embodiments. Further, in some embodiments, this second configuration may be a default configuration.

In addition, bulk storage tank 3 may include one or more inlets (not shown) fluidly coupled to bulk storage tank 3. These inlets may be configured for filling bulk storage tank 3 with a quantity of fluid. These inlets may be positioned anywhere on bulk storage tank 3, for instance, an upper or a lower region. These inlets may further include one or more valves operatively coupled to the inlets and configured to allow or substantially prevent communication with an interior region of bulk storage tank 3.

These inlets may also be configured for performing maintenance on bulk storage tank 3 or for inserting or removing measuring devices from bulk storage tank 3. Alternatively, measuring devices can be configured to remain in bulk storage tank 3. These measuring devices can be configured to measure one or more properties of fluid contained in bulk storage tank 3. The measuring devices can be operatively coupled to a display, a meter, control system 34, or any suitable means for communicating measurement data to an external reader. Such measuring devices can include sensors, including those to detect pressure, temperature, fill level, motion, maintenance indicators, or other suitable parameters. These sensors can be configured to warn a user or control system 34 of certain conditions present or possible with regards to bulk storage tank 3, for instance, by an audio or visual alert.

In addition, bulk storage tank 3 may include one or more outlets (not shown) fluidly coupled to bulk storage tank 3. These outlets may be configured for removing a quantity of fluid from bulk storage tank 3. These outlets may be positioned anywhere on bulk storage tank 3, for instance an upper or a lower region. These outlets may further include one or more valves operatively coupled to the outlets and configured to allow or substantially prevent communication between an interior region of bulk storage tank 3 and a region exterior to bulk storage tank 3. These outlets can also include one or more nozzles to facilitate the transfer of fluid out of bulk storage tank 3.

One or more of these outlets could include a drain system. A drain system could include an emergency drain system, whereby a user or control system 34 could drain bulk storage tank 3 under certain conditions. In addition, one or more outlets could be configured to drain bulk storage tank 3 for maintenance or repairs. One or more of these inlets or outlets could be operatively coupled to conditioners for conditioning the contents of bulk storage tank 3, examples of which will be described in more detail below. These conditioners could be internal or external to bulk storage tank 3.

Bulk storage tank 3 can further include suitable devices for maintaining bulk storage tank 3. For instance, bulk storage tank 3, or any portion of dispensing systems 40, 60, could include means for removing condensation from bulk storage tank 3 or dispense tank 7, or from any inlets, outlets, or supply lines, valves or nozzles. Other suitable devices that could be included in similar locations include de-icers, security devices to prevent tampering with any portion of systems 40, 60, motion dampers to facilitate mobilization of bulk storage tank 3 or dispensing systems 40, 60, odorizers for odorizing the contents of bulk storage tank 3 or systems 40, 60, or any other devices suitable for maintaining and/or operating bulk storage tank 3 or systems 40, 60.

Bulk storage tank 3 can be situated relative to dispense tank 7 and pressurization tank 12, if included, so that the level of liquid in bulk storage tank 3 is disposed relatively higher than the level of liquid in dispense tank 7 and pressurization tank 12. In one embodiment, bulk storage tank 3 can be situated so that the bottom of bulk storage tank 3 is higher than the top of dispense tank 7 and the top of pressurization tank 12, if included. Bulk storage tank 3 can be fluidly coupled to dispense tank 7 and/or pressurization tank 12 by a liquid supply line 5 and a vapor return line 6.

Liquid supply line 5 can include a proximal end and a distal end. A proximal region of liquid supply line 5 can fluidly connect to a lower region of bulk storage tank 3 so that LNG 2 held within bulk storage tank 3 can gravity feed and/or pressure feed into liquid supply line 5. A distal region of liquid supply line 5 can fluidly connect to an upper region of dispense tank 7, as shown in FIG. 1, and can fluidly connect to an upper region of pressurization tank 12, as shown in FIG. 3, or a middle or lower region of dispense tank 7 and a middle or lower region of pressurization tank 12 (not shown), so that liquid from supply line 5 can gravity flow or pressure flow into dispense tank 7 and/or pressurization tank 12.

Liquid supply line 5 can further include one or more valves 27 operatively coupled to liquid supply line 5. Valve 27 can be capable of at least three configurations: a first configuration allowing liquid to flow through liquid supply line 5 along a path "A" through valve 27, a second configuration substantially preventing liquid from flowing through liquid supply line 5 through valve 27, and a third configuration allowing higher pressure vapor in dispense tank 7 to flow from dispense tank 7 to a bottom region of storage tank 3. Valve 27 can include any suitable valve known in the art, including, e.g., ball valves, check valves, and/or butterfly valves, safety pressure release valves, self-actuating valves, shutoff valves, excess flow valves, etc.

In embodiments such as system 60 including pressurization tank 12, liquid supply line 5 can further include one or more valves 51 operatively coupled to liquid supply line 5. Valve 51 can be capable of at least three configurations: a first configuration allowing liquid to flow through liquid supply line 5 along a path "G" through valve 51, a second configuration substantially preventing liquid from flowing through liquid supply line 5 through valve 51, and a third configuration allowing higher pressure vapor in pressurization tank 12 to flow from pressurization tank 12 to a bottom region of storage tank 3. Valve 51 can include any suitable valve known in the art, including, e.g., ball valves, check valves, and/or butterfly valves, safety pressure release valves, self-actuating valves, shutoff valves, excess flow valves, etc.

Vapor return line 6 also includes a proximal end and a distal end. A distal region of vapor return line 6 can fluidly connect to an upper region of dispense tank 7 so a vapor 9 in dispense tank 7 can feed into vapor return line 6. If pressurization tank 12 is included, vapor return line 6 can also fluidly connect to an upper region of pressurization tank 12 so a vapor 17 in pressurization tank 12 can feed into vapor return line 6. A proximal region of vapor return line 6 can fluidly connect to an upper region of bulk storage tank 3 so that vapor can feed into bulk storage tank 3 from vapor return line 6. Vapor return line 6 can be configured to allow vapor communication between bulk supply tank 3 and dispense tank 7 in order to equalize pressures between tanks 3 and 7 as LNG 2 from bulk tank 3 is gravity- and/or pressure-fed through liquid supply line 5 into dispense tank 7. In some embodiments, vapor return line 6 can be configured to allow vapor communication between bulk supply tank 3 and pressurization tank 12 in order to equalize pressures between bulk tank 3 and pressurization tank 12 as LNG 2 from bulk tank 3 is gravity- and/or pressure-fed through liquid supply line 5 into pressurization tank 12.

Vapor return line 6 can further include one or more valves 26 and/or one or more valves 50 operatively coupled to vapor return line 6. Valve 26 can be capable of at least two configurations: a first configuration allowing vapor to flow through vapor return line 6 along a path "B" through valve 26 and a second configuration substantially preventing vapor from flowing through vapor return line 6 through valve 26. Valve 50 can be capable of at least two configurations: a first configuration allowing vapor to flow through vapor return line 6 along a path "H" through valve 50 and a second configuration substantially preventing vapor from flowing through vapor return line 6 through valve 26. Valve 26 and valve 50 can include any suitable valve known in the art, including, e.g., ball valves, check valves, and/or butterfly valves, safety pressure release valves, self-actuating valves, shutoff valves, excess flow valves, etc.

Dispense tank 7 can contain an amount of LNG 8 and an amount of vapor NG 9. Dispense tank 7 can be smaller than bulk tank 3 and can contain less vapor 9 and liquid 8 than bulk storage tank 3. If included, pressurization tank 12 can contain an amount of LNG 13 and an amount of vapor NG 17. Pressurization tank 12 can be smaller than bulk tank 3 and can contain less vapor 17 and liquid 13 than bulk storage tank 3.

In some embodiments, dispense tank 7 can further include one or more measuring devices 10 to measure one or more properties or characteristics of LNG 8 or vapor 9. Measuring device 10 can include any suitable device, such as a density-measuring device, a flow-measuring device, a pressure-measuring device, a temperature-measuring device, a level-measuring device, or any combination thereof. For instance, a density-measuring device may be located adjacent or proximate to a flow-measuring device. In certain embodiments, however, a density-measuring device may be operatively coupled to, yet separated from, a flow-measuring device at a desired distance. Moreover, it should be appreciated that a single density-measuring device may be operatively coupled to a plurality of flow-measuring devices. The density-measuring device may further include a capacitance probe and a temperature probe. The capacitance probe may measure a dielectric constant of the LNG flowing through LNG dispense tank 7, while the temperature probe may measure the temperature of the flowing LNG. The flow-measuring device may include a volumetric flow meter and a secondary temperature probe. The volumetric flow meter may measure a volumetric flow rate of the LNG flowing through LNG dispense tank 7, and the secondary temperature probe may measure the temperature of LNG. Exemplary devices are described in U.S. patent application Ser. No. 13/305,102, entitled LIQUID DISPENSER, filed on Nov. 28, 2011, the entirety of which is expressly incorporated herein by reference.

In some embodiments, pressurization tank 12 can further include one or more measuring devices 41 to measure one or more properties or characteristics of LNG 13 or vapor 17. Measuring device 41 can include any suitable device, such as a density-measuring device, a flow-measuring device, a pressure-measuring device, a temperature-measuring device, a level-measuring device, or any combination thereof. For instance, a density-measuring device may be located adjacent or proximate to a flow-measuring device. In certain embodiments, however, a density-measuring device may be operatively coupled to, yet separated from, a flow-measuring device at a desired distance. Moreover, it should be appreciated that a single density-measuring device may be operatively coupled to a plurality of flow-measuring devices. The density-measuring device may further include a capacitance probe and a temperature probe. The capacitance probe may measure a dielectric constant of the LNG flowing through LNG pressurization tank 12, while the temperature probe may measure the temperature of the flowing LNG. The flow-measuring device may include a volumetric flow meter and a secondary temperature probe. The volumetric flow meter may measure a volumetric flow rate of the LNG flowing through LNG pressurization tank 12, and the secondary temperature probe may measure the temperature of LNG, as described above.

Control system 34 may include a processor and a display. Control system 34 may be in communication with LNG bulk tank 3, LNG dispense tank 7, pressurization tank 12 (if included), measuring devices 10 and 41, any of valves 26-51, or any other component or combination of components in dispensing systems 40, 60. In addition, control system 34 may also be in communication with one or more computers and/or controllers associated with fluid dispensing systems 40, 60. For instance, control system 34 may be in communication with one or more measuring devices 10 and 41, which can include a density-measuring device, comprising a capacitance probe and a temperature probe, and a flow-measuring device, comprising a secondary temperature probe and a volumetric flow meter. As such, control system 34 may receive data, for example, dielectric constant data, temperature data, pressure data and/or volumetric flow rate data to compute and determine other properties of the LNG, such as density and mass flow rate. In one embodiment, a pressure transmitting device 14 and/or a level transmitting device 24 may be operatively coupled to dispense tank 7 and may transmit data about the contents of dispense tank 7 to control system 34. In some embodiments, pressure transmitting device 42 and/or a level transmitting device 43 may be operatively coupled to pressurization tank 12 and may transmit data about the contents of pressurization tank 12 to control system 34.

Control system 34 may also initiate, cease, or otherwise control delivery of LNG 2 from bulk tank 3 to dispense tank 7 and/or to pressurization tank 12, if included, and may control the dispensing of LNG 8 from dispense tank 7 to vehicle tank 21. Control system 34 may perform such control functions based on the data received from device 10, 14, 24, 41, 42, 43 or on other, external data and/or input. In one embodiment, a distal dispensing region may include a temperature transmitter 38, a density probe 33, and a flow transmitter 39 configured to transmit data to control system 34 about the LNG being dispensed from dispense tank 7 to vehicle tank 21. In one embodiment, control system 34 may include a timer or similar means to determine or set a duration of time for which LNG may be dispensed from dispense tank 7. Additionally, control system 34 may control the conditioning of LNG in one or more of bulk storage tank 3, dispense tank 7, and pressurization tank 12, if included. For instance, conditioning could include saturation or pressurization of LNG 8 in dispense tank 7 or in pressurization tank 12, as discussed further below.

Control system 34 may include a processor operatively connected to dispensing systems 40, 60. A processor may include a Programmable Logic Controller (PLC), a Programmable Logic Relay (PLR), a Remote Terminal Unit (RTU), a Distributed Control System (DCS), a printed circuit board (PCB), or any other type of processor capable of controlling dispensing systems 40, 60. A display can be operatively connected to control system 34 and may include any type of device (e.g., CRT monitors, LCD screens, etc.) capable of graphically depicting information. For example, a display of control system 34 may depict information related to properties of the dispensed LNG including dielectric constant, temperature, density, volumetric flow rate, mass flow rate, the unit price of dispensed LNG, and related costs.

Figure 2:
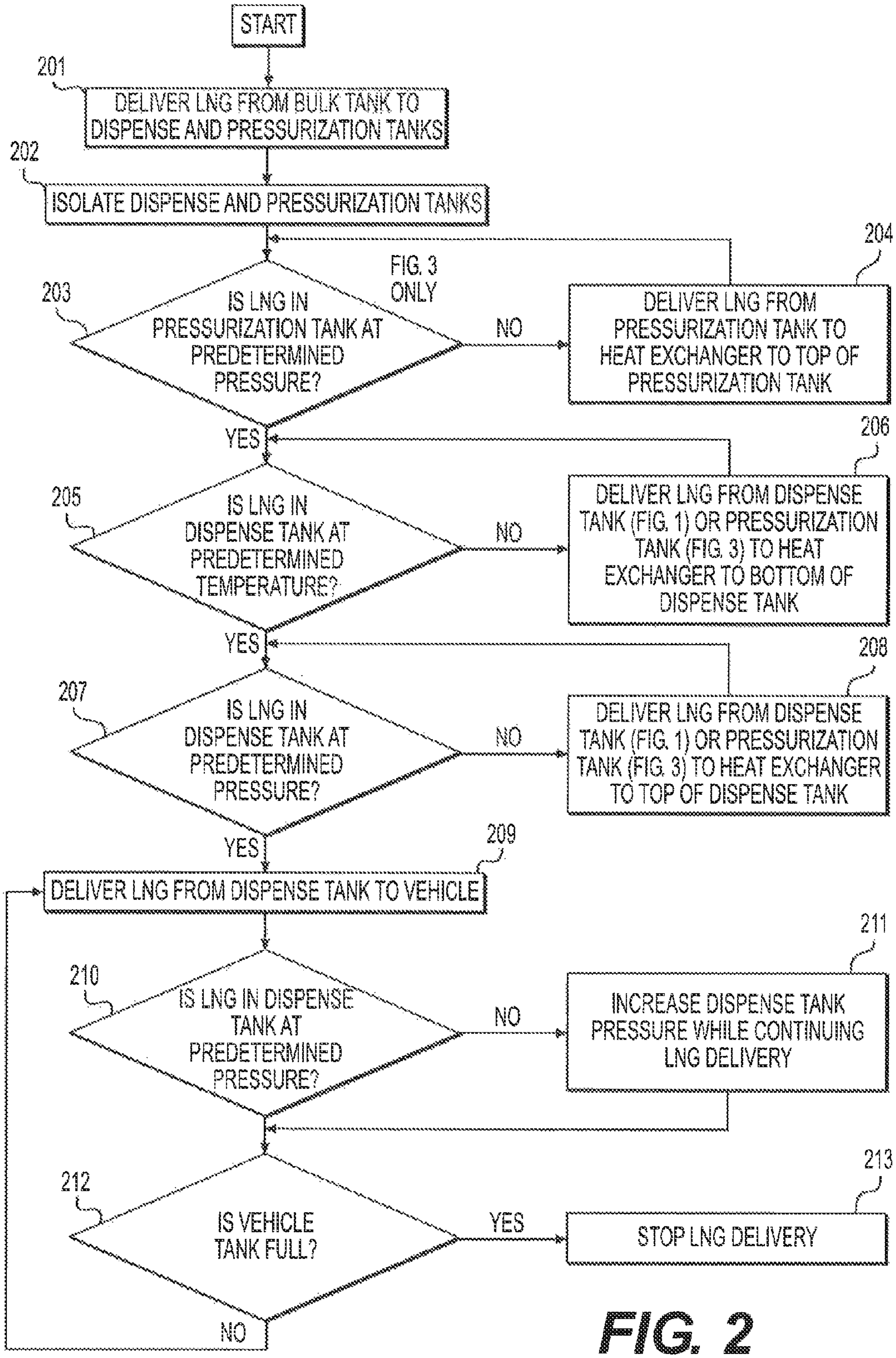
FIG. 2 illustrates a flow chart of an exemplary process of dispensing fluid, according to a further embodiment of the present disclosure.

Referring now to FIG. 2, there is shown an exemplary process of dispensing fluid. During use, in one embodiment, a user may activate control system 34 to initiate a dispensing event via dispensing systems 40, 60. Once dispensing systems 40, 60 are activated, control system 34 can automatically configure dispensing systems 40, 60 so that LNG 2 in bulk storage tank 3 gravity feeds or pressure feeds into liquid supply line 5, step 201 in FIG. 2. Control system 34, a user, or a self-actuating valve can configure valve 27 to allow LNG 2 to gravity feed or pressure feed from bulk storage tank 3, through liquid supply line 5, and into dispense tank 7. As dispense tank 7 fills with LNG 2 from bulk storage tank 3, NG vapor 9 in dispense tank 7 may be pushed out of dispense tank 7. Control system 34, a user, or a self-actuating valve can configure valve 26 to allow vapor 9 to flow through vapor return line 6. Vapor 9 can enter vapor return line 6 and follow path "B" out of dispense tank 7 and into bulk storage tank 3 to equalize the pressure between dispense tank 7 and bulk storage tank 3.

Similarly, in some embodiments, control system 34, a user, or a self-actuating valve can configure valve 51 to allow LNG 2 to gravity feed or pressure feed from bulk storage tank 3, through liquid supply line 5, and into pressurization tank 12. As pressurization tank 12 fills with LNG 2 from bulk storage tank 3, NG vapor 17 in pressurization tank 12 may be pushed out of pressurization tank 12. Control system 34, a user, or a self-actuating valve can configure valve 50 to allow vapor 17 to flow through vapor return line 6. Vapor 17 can enter vapor return line 6 and follow path "H" out of pressurization tank 12 and into bulk storage tank 3 to equalize the pressure between pressurization tank 12 and bulk storage tank 3.

When dispense tank 7 has reached a desired fill level, control system 34, a user, or self-actuating valves can close liquid supply valve 27 and vapor return valve 26, stopping the flow of LNG 2 from bulk storage tank 3 into dispense tank 7, and isolating dispense tank 7 from bulk storage tank 3, step 202 in FIG. 2. Control system 34 may detect whether dispense tank 7 has reached a desired fill level in a number of ways, including user input. Alternatively, control system 34 could receive signals from measuring device 10 operatively connected to dispense tank 7, or an equivalent device (e.g., sensors) that can be located in dispense tank 7 or bulk tank 3, to detect whether the LNG level in dispense tank 7 has reached or risen above a pre-determined level fill. In one embodiment, dispense tank 7 could be operatively connected to level transmitting device 24 and/or pressure transmitting device 14 that could detect and transmit the fill level of dispense tank 7 to control system 34. Device 10, 24, 14 or any other device could include pressure sensors (e.g., differential pressure sensors), flow rate detectors, weight sensors, or any other suitable measuring device(s).

Similarly, when pressurization tank 12 has reached a desired fill level, control system 34, a user, or self-actuating valves can close liquid supply valve 51 and vapor return valve 50, stopping the flow of LNG 2 from bulk storage tank 3 into pressurization tank 12, and isolating pressurization tank 12 from bulk storage tank 3, step 202 in FIG. 2. Control system 34 may detect whether pressurization tank 12 has reached a desired fill level in a number of ways, including user input. Alternatively, control system 34 could receive signals from measuring device 41 operatively connected to pressurization tank 12, or an equivalent device (e.g., sensors) that can be located in pressurization tank 12, to detect whether the LNG level in pressurization tank 12 has reached or risen above a pre-determined level fill. In one embodiment, pressurization tank 12 could be operatively connected to level transmitting device 43 and/or pressure transmitting device 42 that could detect and transmit the fill level of pressurization tank 12 to control system 34. Device 41, 42, 43 or any other device could include pressure sensors (e.g., differential pressure sensors), flow rate detectors, weight sensors, or any other suitable measuring device(s).

In dispensing system 60 of FIG. 3 including a separate pressurization tank 12, once in pressurization tank 12, LNG 13 may not be ready for saturating or pressurizing dispense tank 7. In such circumstances, a user or control system 34 can automatically begin configuring dispensing system 60 to adjust pressurization tank 12 to a proper pressure for saturating and/or pressurizing LNG 8 in dispense tank 7, step 203 and step 204 in FIG. 2. Alternatively or additionally, a user can configure dispensing system 60 to adjust pressurization tank 12 to a proper pressure.

Pressurization tank 12 can be fluidly coupled to a pressure-building line 46, which can gravity feed or pressure feed a portion of LNG 13 from pressurization tank 12 through valve 44 and into heat exchanger 45, step 204 in FIG. 2. Once the LNG has passed through heat exchanger 45 and becomes at least partially vaporized NG, it can follow path "I" into an upper region of pressurization tank 12. Returning the at least partially vaporized NG to an upper region of pressurization tank 12 can increase the pressure inside pressurization tank 12. Control system 34 can receive data from measuring device 41 or pressure transmitting device 42 operatively connected to pressurization tank 12 to determine whether a desired pressure inside pressurization tank 12 has been reached, step 203 in FIG. 2. When pressurization tank 12 reaches a desired, pre-determined pressure, control system 34 can automatically close supply valve 44, preventing a portion of LNG 13 from draining out of pressurization tank 12 and into heat exchanger 45, step 203 in FIG. 2. Alternatively, a user or a self-actuating valve can cause supply valve 44 to close. At this point, LNG 13 may be ready to saturate LNG 8 in dispense tank 7, step 205 in FIG. 2.

Once in dispense tank 7, LNG 8 may not yet be ready for dispensing to vehicle tank 21. For instance, the saturated pressure (temperature) of LNG 8 may need to be increased before dispensing (step 205 in FIG. 2), depending upon the properties and requirements of vehicle tank 21 into which LNG 8 can be dispensed. When a liquid is saturated, the liquid temperature has reached its boiling point at the given pressure. For example, the boiling point of LNG at 0 psig is −259° F., and the boiling point at 100 psig is −200° F. LNG at −200° F. can be defined as 100 psig saturation pressure.

Accordingly, to increase the saturation pressure of LNG 8 to the required set point. LNG 8 may need to be warmed to the corresponding saturated temperature. Control system 34 may detect whether LNG 8 should be saturated by user input or from signals received from measuring device 10 operatively connected to dispense tank 7. For instance, control system 34 may compare the saturated pressure set point, which may be input by a user or stored in memory, to the LNG 8 temperature signals received from measuring device 10.

In system 40 of FIG. 1, to substantially saturate LNG 8 for dispensing, if required, a lower region of dispense tank 7 can be operatively coupled to a liquid drain line 11 such that LNG 8 from dispense tank 7 can gravity feed or pressure feed into liquid drain line 11. Liquid drain line 11 can include one or more supply valves 29. Valve 29 can be capable of at least two configurations: a first configuration allowing liquid to flow into liquid drain line 11 along a path "C" through valve 29, and a second configuration substantially preventing liquid from flowing through liquid drain line 11 through valve 29.

Liquid drain line 11 can be operatively coupled to a heat exchanger 25 and can direct LNG from liquid drain line 11 into heat exchanger 25, step 206 in FIG. 2. Heat exchanger 25 can include any suitable mechanism for heating liquid known in the art, including but not limited to, an electric or hot water heat exchanger. Further, heat exchanger 25 could include a shell and tube heat exchanger, a plate heat exchanger, a plate-fin heat exchanger, or any other suitable heat exchanger. Additionally, heat exchanger 25 may warm the LNG by facilitating transfer of energy with ambient conditions.

Once exiting heat exchanger 25, the heated LNG can continue along drain line 11 along flow path "C," which can include one or more valves 28. Valve 28 can be capable of at least two configurations: a first configuration allowing heated liquid and/or resulting vaporized NG from heat exchanger 25 to flow along path "C" through valve 28, and a second configuration allowing heated liquid and/or resulting vaporized NG to flow along a path "D" through valve 28. To substantially saturate LNG 8 in dispense tank 7, valve 28 can direct the heated LNG and/or resulting vaporized NG along path "C" through a supply line 18. Supply line 18 can be fluidly coupled to a lower region of dispense tank 7. The heated LNG from supply line 18 can be reintroduced back into a lower region of dispense tank 7 (step 206 in FIG. 2) so that it travels upwards through LNG 8 in dispense tank 7, warming LNG 8. Heat exchanger 25 may at least partially vaporize the LNG passed through it. According to such an embodiment, dispense tank 7 may further include a suitable device, such as, for example, a sparging nozzle 37 operatively connected to supply line 18 to direct vaporized NG into a lower region of dispense tank 7. In this embodiment, the vaporized NG could bubble up through LNG 8, warming LNG 8.

Control system 34 can continue draining LNG 8 into drain line 11, through heat exchanger 25, and reintroducing the heated LNG and/or vaporized NG into dispense tank 7 until LNG 8 has reached a desired temperature. Control system 34 may detect whether LNG 8 has reached a desired temperature by receiving data from measuring device 10 operatively coupled to LNG dispense tank 7, step 205 in FIG. 2. At that point, control system 34 can automatically close supply valve 29, preventing LNG 8 from draining out of dispense tank 7 and into heat exchanger 25, step 207 in FIG. 2. Alternatively, a user or a self-actuating valve can close supply valve 29.

In system 60 shown in FIG. 3, to substantially saturate LNG 8 for dispensing, if required, a lower region of pressurization tank 12 can be operatively coupled to a liquid drain line 52 such that LNG 13 from pressurization tank 12 can be gravity- and/or pressure-fed into liquid drain line 52.

Liquid drain line 52 can be operatively coupled to a heat exchanger 25 and can direct LNG from liquid drain line 52 into heat exchanger 25, step 206 in FIG. 2. Heat exchanger 25 can include any suitable mechanism for heating liquid known in the art, as discussed above.

Once exiting heat exchanger 25, the heated LNG can continue along drain line 52 along flow path "C," which can include one or more valves 48. Valve 48 can achieve at least two configurations: a first configuration allowing heated liquid and/or resulting vaporized NG from heat exchanger 25 to flow along path "C" through valve 48, and a second configuration preventing heated liquid and/or resulting vaporized NG from flowing along a path "C" through valve 48. To substantially saturate LNG 8 in dispense tank 7, valve 48 can direct the heated LNG and/or resulting vaporized NG along path "C" through a supply line 18 in the first configuration. Supply line 18 can be fluidly coupled to a lower region of dispense tank 7. The heated LNG from supply line 18 can be introduced back into a lower region of dispense tank 7 (step 206 in FIG. 2) so that it travels upwards through LNG 8 in dispense tank 7, warming LNG 8. Heat exchanger 25 may at least partially vaporize the LNG passed through it. According to such an embodiment, dispense tank 7 may further include a suitable device, such as, for example, a sparging nozzle 37 as discussed above. In this embodiment, the vaporized NG could bubble up through LNG 8, warming LNG 8.

Control system 34 can continue draining LNG 13 into drain line 52, through heat exchanger 25, and introducing the heated LNG and/or vaporized NG into dispense tank 7 until LNG 8 has reached a desired temperature. Control system 34 may detect whether LNG 8 has reached a desired temperature by receiving data from measuring device 10 operatively coupled to LNG dispense tank 7, step 205 in FIG. 2. At that point, control system 34 can automatically close supply valve 48, preventing LNG 13 from draining out of pressurization tank 12 and into heat exchanger 25, step 205 in FIG. 2. Alternatively, a user or a self-actuating valve can close supply valve 48.

Once LNG 8 in dispense tank 7 is substantially saturated, control system 34 can automatically begin configuring dispensing system 60 to adjust dispense tank 7 to a proper pressure for dispensing LNG 8 into vehicle tank 21, step 207 in FIG. 2. Alternatively, a user can configure dispensing system 40 to adjust dispense tank 7 to a proper pressure.

In dispensing system 40 shown in FIG. 1, as discussed above, dispense tank 7 can be fluidly coupled to drain line 11, which can gravity feed or pressure feed a portion of LNG 8 from dispense tank 7 through valve 29 and into heat exchanger 25, step 208 in FIG. 2. Once the LNG has passed through heat exchanger 25 and becomes at least partially vaporized NG, it can follow an alternate path "D." Instead of directing the heated LNG and/or vaporized NG into a lower region of dispense tank 7, valve 28 can be configured to direct the at least partially vaporized NG into a supply line 19 along path "D."

Supply line 19 can direct the at least partially vaporized NG back into an upper region of dispense tank 7, step 208 in FIG. 2. In the embodiment shown in FIG. 1, supply line 19 can fluidly connect with vapor return line 6 and return the at least partially vaporized NG to dispense tank 7 via line 6 along path "D." In another embodiment (not shown), line 19 may directly connect with an upper region of dispense tank 7.

Returning the at least partially vaporized NG to an upper region of dispense tank 7 can increase the pressure inside dispense tank 7. Control system 34 can receive data from measuring device 10 or pressure transmitting device 14 operatively connected to dispense tank 7 to determine whether a desired pressure inside dispense tank 7 has been reached, step 207 in FIG. 2. When dispense tank 7 reaches a desired, pre-determined pressure, control system 34 can automatically close supply valve 29, preventing a portion of LNG 8 from draining out of dispense tank 7 and into heat exchanger 25, step 207 in FIG. 2. Alternatively, a user or a self-actuating valve can cause supply valve 29 to close. At this point, LNG 8 may be ready to dispense to vehicle tank 21, step 209 in FIG. 2.

In dispensing system 60 of FIG. 3, as discussed above, pressurization tank 12 can be fluidly coupled to drain line 52, which can gravity feed or pressure feed a portion of LNG 13 from pressurization tank 12 and into heat exchanger 25, step 208 in FIG. 2. Once the LNG has passed through heat exchanger 25 and becomes at least partially vaporized NG, it can follow an alternate path "D." Instead of directing the heated LNG and/or vaporized NG into a lower region of dispense tank 7, valves 48 and 49 can be configured to direct the at least partially vaporized NG into a supply line 19 along path "D."

Supply line 19 can direct the at least partially vaporized NG into an upper region of dispense tank 7, step 208 in FIG. 2. In dispensing system 60 shown in FIG. 3, supply line 19 can fluidly connect with vapor return line 6 and return the at least partially vaporized NG to dispense tank 7 via line 19 along path "D". In another embodiment (not shown), line 19 may directly connect with an upper region of dispense tank 7.

Sending the at least partially vaporized NG to an upper region of dispense tank 7 can increase the pressure inside dispense tank 7. Control system 34 can receive data from measuring device 10 or pressure transmitting device 14 operatively connected to dispense tank 7 to determine whether a desired pressure inside dispense tank 7 has been reached, step 207 in FIG. 2. When dispense tank 7 reaches a desired, pre-determined pressure, control system 34 can automatically close supply valve 49, preventing a portion of LNG 13 from draining out of pressurization tank 12 and into heat exchanger 25, step 207 in FIG. 2. Alternatively, a user or a self-actuating valve can cause supply valve 49 to close. At this point, LNG 8 may be ready to dispense to vehicle tank 21, step 209 in FIG. 2.

Once LNG 8 is ready to dispense, control system 34 can either automatically configure dispensing systems 40, 60 to begin dispensing LNG 8 to vehicle tank 21, or it can await user input to begin dispensing.

Prior to dispensing, vehicle tank 21 may need to be vented. For instance, if the pressure in vehicle tank 21 is greater than the pressure in dispense tank 7, vehicle tank 21 may require venting in order to bring the pressure in vehicle tank 21 below that of dispense tank 7. For instance, vehicle tank 21 may need to be vented if the pressure within it is greater than approximately 160 psig. Venting may occur at any time during the dispensing process prior to the initiation of dispensing LNG 8 into vehicle tank 21.

In order to accommodate different types of vehicle tanks, dispensing systems 40, 60 shown in FIGS. 1 and 3 may have multiple different components and methods for venting vehicle tank 21. For instance, vehicle tank 21 may include a separate fill receptacle and a separate vent nozzle. In one embodiment, to vent vehicle tank 21, a user can connect a vent receptacle 23 to a vehicle tank vent nozzle (not shown) coupled to vehicle tank 21. In some embodiments, once vent receptacle 23 is connected to vehicle tank 21, the user may open a valve operatively coupled to vehicle tank 21 to allow vapor to flow out of vehicle tank 21 and into a vent line 22 operatively coupled to vent receptacle 23. Line 22 can include one or more vent valves 32. Valve 32 can be capable of at least two configurations: a first configuration allowing vapor to flow through vent line 22 along a path "F" through valve 32, and a second configuration allowing for venting through valve 32 to a vent stack.

The user or control system 34 can position valve 32 so as to allow vapor from vehicle tank 21 to flow along vent line 22, through valve 32, along a vent line 20 operatively coupled to valve 32, and into bulk storage tank 3. Bulk tank 3 can contain more LNG 2 than dispense tank 7, and thus can contain more liquid to absorb the heat from the vapor vented from vehicle tank 21. If the pressure in bulk storage tank 3 is too great to receive the vapor vented from vehicle tank 21, then the vented vapor can be vented from bulk storage tank 3 into a vent stack 35 fluidly coupled to bulk tank 3. Alternatively, the vented vapor from vehicle tank 21 can be vented directly to a vent stack. When vehicle tank 21 reaches a desired pressure, for instance, less than approximately 160 psig, the user can close the vehicle vent valve and disconnect vent receptacle 23 from a vent nozzle operatively coupled to vehicle tank 21.

Alternatively, vehicle tank 21 may not include a vent nozzle and may only include a fill receptacle. In this case, the user can vent vehicle tank 21 by connecting a fill nozzle 16 to the vehicle tank fill receptacle (not shown). In some embodiments, the user may open a valve operatively coupled to vehicle tank 21 to allow vapor from vehicle tank 21 to flow out of vehicle tank 21 and into a fill line 15 operatively coupled to fill nozzle 16. Fill line 15 can include one or more fill valves 30. Valve 30 can be capable of at least two configurations: a first configuration allowing vapor to flow through fill line 15 through valve 30 to dispense tank 7, and a second configuration allowing for venting through valve 30 to a vent stack.

The user, a self actuating valve, or control system 34, can position valve 30 so as to allow vapor from vehicle tank 21 to flow along fill line 15, through valve 30, and into dispense tank 7. If the pressure in dispense tank 7 is too great to receive the vapor vented from vehicle tank 21, then the vented vapor can be vented from dispense tank 7 into a vent stack 36 fluidly coupled to dispense tank 7. Alternatively, the vented vapor from vehicle tank 21 can be vented through valve 30 to a vent stack. When vehicle tank 21 reaches a desired pressure, for instance, less than approximately 160 psig, the user can close the vehicle vent valve and disconnect fill nozzle 16 from vehicle tank 21.

Bulk storage tank 3, dispense tank 7, and pressurization tank 12 may each have their own vent stacks 35, 36, 47. In another embodiment, dispensing systems 40, 60 may include a common vent stack instead of, or in addition to, vent stacks 35, 36, 47. Further, vent stacks 35, 36, 47 and/or the common vent stack may be positioned above control system 34. For instance, vent stacks 35, 36, 47 and/or the common vent stack may be positioned approximately 15 feet or higher above the ground to promote safety.

Once LNG 8 is substantially saturated and dispense tank 7 and vehicle tank 21 are each at their desired pressures, dispensing systems 40, 60 may be ready for dispensing to vehicle tank 21. To commence dispensing, a user can connect LNG fuel nozzle 16 to a vehicle tank fill receptacle (not shown). Once vehicle tank 21 is connected to fill nozzle 16, dispensing can begin, step 209 in FIG. 2. In one embodiment, dispensing can begin automatically once control system 34 has detected that vehicle tank 21 has been properly connected to fill nozzle 16. In another embodiment, control system 34 can require user input in order to begin dispensing LNG 8 from dispense tank 7 to vehicle tank 21.

Fill line 15 may include one or more dispense valves 31. Valve 31 can be capable of at least two configurations: a first configuration allowing LNG to flow through fill line 15 along a path "E," through valve 31 to nozzle 16, and a second configuration substantially preventing LNG 8 from flowing through fill line 15, along path "E," and through valve 31 to nozzle 16. To initiate dispensing, control system 34 can automatically open valve 31 to allow LNG to flow from dispense tank 7 and along path "E," through drain line 11, through valve 30, through line fill 15, through valve 31, out nozzle 16, and into vehicle tank 21. Alternatively, a user or a self-actuating valve may open valve 31. Further, LNG 8 may gravity feed or pressure feed into drain line 11 and along path "E" into vehicle tank 21, or LNG 8 may flow from dispense tank 7 into vehicle tank 21 along a pressure gradient between tanks 7 and 21.

Once dispensing systems 40, 60 begin dispensing LNG 8 to vehicle tank 21, control system 34 can automatically record the amount of LNG 8 dispensed in order to provide accurate dispensing. A number of suitable devices may be used to record the amount of LNG dispensed. Device 10 may provide dispensing data, and device 10 could include, for instance, a temperature transmitter, a flow meter, a pressure calculator, a density meter, or other suitable devices, or combinations of devices, as described above. Exemplary devices are described in U.S. application Ser. No. 13/305,102, entitled LIQUID DISPENSER, filed on Nov. 28, 2011, the entirety of which is expressly incorporated herein by reference. In addition, fill line 15 may include temperature transmitter 38 configured to measure the temperature of LNG passing through fill line 15 or to transmit data to control system 34, or both. Fill line 15 may also include a density measuring device 33. Fill line 15 may also include a pressure transmitter 39 configured to measure the pressure of LNG passing through fill line 15 or to transmit data to control system 34, or both.

While dispensing systems 40, 60 dispense LNG 8 from dispense tank 7 to vehicle tank 21, control system 34 may also receive data from measuring device 10, 14 regarding the pressure level inside dispense tank 7. Dispensing LNG 8 from dispense tank 7 to vehicle tank 21 may be at least partially aided by the existence of differences in pressure between dispense tank 7 and vehicle tank 21. Accordingly, a change in pressure in dispense tank 7 could affect the accuracy, ability, or efficiency of dispensing LNG 8 to vehicle tank 21. To account for this, control system 34 may receive data from measuring device 10, 14, and may automatically begin the pressure-increasing process (described above) if a drop in pressure in dispense tank 7 is detected, steps 210 and 211 in FIG. 2.

In dispensing system 40 of FIG. 1, to begin the pressure-increasing process described above, control system 34 can automatically open valve 29 to allow LNG 8 from dispense tank 7 to drain into line 11. As discussed in detail earlier, the LNG could then flow into heat exchanger 25 along path "D" (step 207 in FIG. 2) and back into an upper region of dispense tank 7 (step 208 in FIG. 2) to increase LNG 8 pressure in dispense tank 7. Once control system 34 detects a sufficient increase in pressure, control system 34 could automatically close valve 29 to cease pressure building, step 210 in FIG. 2.

In dispensing system 60 of FIG. 3, to begin the pressure-increasing process described above, control system 34 can automatically open valve 49 to allow LNG 13 from pressurization tank 12 to drain into line 52. As discussed in detail earlier, the LNG could then flow into heat exchanger 25 along path "D" (step 208 in FIG. 2) and into an upper region of dispense tank 7 (step 208 in FIG. 2) to increase LNG 8 pressure in dispense tank 7. Once control system 34 detects a sufficient increase in pressure, control system 34 could automatically close valve 49 to cease pressure building, step 210 in FIG. 2.

Control system 34 may initiate pressure building as many times as required during a dispensing cycle. In a further embodiment, control system 34 may not initiate pressure building during a dispensing cycle. Additionally, control system 34 may temporarily cease dispensing LNG 8 to vehicle tank 21 while building pressure in dispense tank 7, or alternatively, control system 34 may continue to dispense LNG 8 to vehicle tank 21 while building pressure in dispense tank 7. Alternatively, a user may direct this process instead of, or in addition to, control system 34.

Once control system 34 detects that vehicle tank 21 has been filled to a desired level (step 212), control system 34 can automatically stop dispensing LNG (step 213) by closing valve 31. A number of suitable devices may be used to detect fill level. Device 10, 14, 24, 33, 38, 39 may provide dispensing data, and could include, for instance, a volumetric flow reader, temperature transmitter, pressure calculator, or other devices or combinations of devices, as described above. Alternatively, a user may direct this process instead of, or in addition to, control system 34.

It should be appreciated that any steps of dispensing systems 40, 60 listed in this disclosure can be automated through the use of control system 34, manual, or user-directed. User input, as discussed herein, can consist of any suitable means for inputting commands into a control system, for instance, operating at least one button, switch, lever, trigger, voice or motion activation, touch screen, or such, or a combination thereof. Moreover, automated portions of dispensing systems 40, 60 can include override mechanisms that allow the user to interrupt control of control system 34 over dispensing systems 40, 60. Further, the steps disclosed herein can occur in any order, or may be repeated as many times as desired.

Portions of supply and return lines described in this embodiment are listed as discrete sections for convenience. Supply and return lines can be continuous or discrete sections fluidly connected. Additionally, supply and return lines can include any number of valves. The valves can include any suitable type of valve, for instance, 1-way or multi-way valves, or any combination thereof. Further, supply and return lines may include a number of nozzles in addition to those listed in this description. The nozzles can include any suitable type of nozzle, for instance, venturi, sparger, or flow nozzles. Additionally, the components listed here may be replaced with any suitable component capable of performing the same or like functions. Different embodiments may alter the arrangement of steps or components, and the invention is not limited to the exact arrangements described herein.

The many features and advantages of the present disclosure are apparent from the detailed specification, and thus, it is intended by the appended claims to cover all such features and advantages of the present disclosure which fall within the true spirit and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A fluid dispensing system, comprising:

a first tank configured to contain a first fluid;

a second tank configured to contain a second fluid;

a third tank configured to contain a third fluid;

wherein the first tank is fluidly connected to the second tank by a first conduit, and the first fluid in the first tank is configured to be gravity-fed or pressure-fed through the first conduit to the second tank;

wherein the first tank is fluidly connected to the third tank by a second conduit, and the first fluid in the first tank is configured to be gravity-fed or pressure-fed through the second conduit to the third tank; and a conditioning system fluidly connected to the third tank and the second tank wherein the conditioning system comprises:

a first heat exchanger;

a third conduit extending from a lower region of the third tank, to the first heat exchanger, and directly to an upper region of the third tank;

wherein in a first configuration the conditioning system directs the third fluid to flow from the lower region of the third tank, through the first heat exchanger, and directly to the upper region of the third tank, whereby a pressure in the third tank is increased;

a second heat exchanger a fourth conduit extending from the lower region of the third tank, to the second heat exchanger, and directly to an upper region of the second tank;

wherein in a second configuration the conditioning system directs the third fluid to flow from the lower region of the third tank, through the second heat exchanger, and directly to the upper region of the second tank, whereby a pressure in the second tank is increased; and a fifth conduit fluidly coupling the second heat exchanger and a lower region of the second tank, wherein in a third configuration the conditioning system directs the third fluid to flow directly from the second heat exchanger to the lower region of the second tank, whereby the second fluid is saturated.

2. The fluid dispensing system of claim 1, wherein the system does not include a pump.

3. The fluid dispensing system of claim 1, wherein the first and the second heat exchangers facilitate the transfer of energy with an ambient condition.

4. The fluid dispensing system of claim 1, wherein the first and the second heat exchangers each include a vaporizer configured to at least partially vaporize the fluid passed through them.

5. The fluid dispensing system of claim 4 further comprising a sparging nozzle, wherein the system in the third configuration passes the partially vaporized fluid to the lower region of the second tank through the sparging nozzle.

6. The fluid dispensing system of claim 1, wherein the second fluid is the same as the first fluid and the third fluid is the same as the first fluid.

7. The fluid dispensing system of claim 6, wherein the first fluid is liquefied natural gas.

8. The fluid dispensing system of claim 1, wherein the system further includes a control system.

9. The fluid dispensing system of claim 8, wherein the control system includes a programmable logic controller.

10. The fluid dispensing system of claim 1, wherein the first tank is positioned so that the bottom of the first tank is located above the top of the second tank and above the top of the third tank.

11. The fluid dispensing system of claim 1, wherein the system includes one or more measuring devices configured to measure at least one property of the fluid.

12. The fluid dispensing system of claim 11, wherein the one or more measuring devices is operatively coupled to at least one of the second tank and the third tank.

13. The fluid dispensing system f claim 1, wherein the first and the second heat exchangers are configured to be gravity-fed by the third tank.

14. A method for dispensing a fluid without the use of a pump, comprising:

gravity-feeding or pressure-feeding the fluid from a first tank to a second tank through a first conduit;

gravity-feeding or pressure-feeding the fluid from a first tank to a third tank through a second conduit;

pressurizing the fluid in the third tank by dispensing the fluid from a lower region of the third tank, passing the fluid through a first heat exchanger, and returning the fluid directly from the first heat exchanger to an upper region of the third tank;

saturating the fluid in the second tank by dispensing the fluid from the lower region of the third tank, passing the fluid through a second heat exchanger, and passing the fluid directly from the second heat exchanger into a lower region of the second tank; and pressurizing the fluid in the second tank by dispensing the fluid from a lower region of the third tank, passing the fluid through the second heat exchanger, and passing the fluid directly from the second heat exchanger into an upper region of the second tank.

15. The method of claim 14, wherein the method further comprises dispensing the fluid from the tank to a fourth tank.

16. The method of aim 15, wherein the method further comprises venting the fourth tank.

17. The method of claim 14, wherein pressurizing the fluid in the third tank further includes measuring at least one property of the fluid in the third tank.

18. The method of claim 14, wherein saturating the fluid in the second tank further includes measuring at least one property of the fluid in the second tank.

19. The method of claim 14, wherein pressurizing the fluid in the second tank further includes measuring at least one property of the fluid in the second tank.

20. An LNG dispensing system, comprising:

a control system including a programmable logic controller;

a first tank configured to contain LNG;

a second tank configured to contain LNG, wherein a bottom region of the first tank is positioned above an upper region of the second tank;

a third tank configured to contain LNG, wherein a bottom region of the first tank is positioned above an upper region of the third tank;

wherein the first tank is fluidly connected to the second tank by a first conduit, wherein the first tank is fluidly connected to the third tank by a second conduit, and wherein the LNG in the first tank is configured to be gravity-fed or pressure-fed to the second tank and the third tank;

a first measuring device for measuring at least one property of the LNG, wherein the first measuring device is operatively coupled to the second tank;

a second measuring device for measuring at least one property of the LNG, wherein the second measuring device is operatively coupled to the third tank; and a conditioning system fluidly connected to the second tank and the third tank, wherein the conditioning system comprises:

at least one heat exchanger wherein the at least one heat exchanger includes a vaporizer configured to facilitate the transfer of energy with an ambient condition to at least partially vaporize the LNG passed through it;

a third conduit extending from a lower region of the third tank directly to the at least one heat exchanger and directly from the at least one heat exchanger to an upper region of the third tank:

a fourth conduit extending from the lower region of the third tank directly to the at least one heat exchanger and directly from the at least one heat exchanger to an upper region of the second tank; and a fifth conduit extending from the lower region of the third tank directly to the at least one heat exchanger and directly from the at least one heat exchanger to a lower region of the second tank;

wherein n a first configuration the conditioning system is configured to pass the LNG from the lower region of the third tank, through the at least one heat exchanger, and the at least partially vaporized LNG is passed to the upper region of the third tank whereby a pressure in the third tank is increased;

wherein in a second configuration the conditioning system is configured to pass the LNG from the lower region of the third tank through the,at,least one heat exchanger and the at least partially vaporized LNG is passed to the upper region of the second tank, whereby a pressure in the second tank is increased; and wherein in a third configuration the conditioning system is configured to pass the at least partially vaporized LNG from the at least one heat exchanger into the lower region of the second tank via a sparging nozzle, whereby the LNG in the second tank is saturated.

21. The LNG dispensing system of claim 20, wherein the LNG dispensing system does not include a pump.

* * * * *